United States Patent [19]

Showalter

[11] Patent Number: 4,557,236

[45] Date of Patent: Dec. 10, 1985

[54] COMBUSTION ROUGHNESS SERVO CONTROL TO CONTROL FUEL/AIR METERING OR EGR METERING TO AN INTERNAL COMBUSTION ENGINE

[75] Inventor: Merle R. Showalter, Madison, Wis.

[73] Assignee: Automotive Engine Associates, Madison, Wis.

[21] Appl. No.: 566,902

[22] Filed: Dec. 29, 1983

[51] Int. Cl.$^4$ .................... F02M 7/00; G01M 15/00
[52] U.S. Cl. ........................ 123/435; 73/35; 123/436
[58] Field of Search ............ 123/425, 435, 436, 419; 73/35

[56] References Cited

U.S. PATENT DOCUMENTS

| | | | |
|---|---|---|---|
| 2,517,976 | 8/1950 | Clarke | 123/435 X |
| 4,153,013 | 5/1979 | Bianchi et al. | 123/435 |
| 4,161,162 | 7/1979 | Latsch et al. | 123/435 |
| 4,232,545 | 11/1980 | Dobler et al. | 123/435 X |
| 4,233,943 | 11/1980 | Rogora et al. | 123/435 X |
| 4,314,534 | 2/1982 | Nakajima et al. | 123/435 X |

Primary Examiner—Parshotam S. Lall
Assistant Examiner—W. R. Wolfe
Attorney, Agent, or Firm—Witherspoon & Hargest

[57] ABSTRACT

A servo control which adjusts the supply of combustion diluent (either excess air or EGR) upwards until the statistical variation of flame speed achieves a set limit. The system is intended as a control coefficient input to an automatic control system capable of more rapid dynamic response than the roughness controller itself. For engines characterized by exceptional homogeneity and in-cylinder flow control, control of flame speed variability up to set limit nearly minimizes $NO_x$ emissions and very nearly optimizes fuel efficiency at all engine speeds and loads. Two "measures" of flame speed are disclosed, first peak blowdown pressure in the exhaust, and second, the ionization breakdown voltage of an additional spark fired a specified number of crank angles after the ignition spark.

4 Claims, 19 Drawing Figures

Call last breakdown voltage $V_n$

Basic control logic:

if $Av_n \geq \sum_{n}^{-16} v_i$ slew to increase EGR if $Bv_n \leq \sum_{n}^{-16} v_i$ slew to increase EGR if $Av_n \leq \sum_{n}^{-16} v_i \leq \beta\rho_n$ slew to decrease EGR Slew rate increasing EGR $\approx$ 5 times slew ratio decreasing EGR (adjustable)

Basic control logic:

$$\text{if } Av_n \geq \sum_{n}^{-16} v_i \qquad \text{slew } \underline{\text{rich}}$$

$$\text{if } Bv_n \leq \sum_{n}^{-16} v_i \qquad \text{slew } \underline{\text{rich}}$$

$$\text{if } Av_n \leq \sum_{n}^{-16} v_i \leq \beta P_n \qquad \text{slew } \underline{\text{lean}}$$

FIG. 14

Slew rate lean $\approx$ .015 A/F ratio/firing (adjustable)

Slew rate rich $\approx$ .15 A/F ratio/firing (adjustable)

COMBUSTION ROUGHNESS SERVO CONTROL TO CONTROL FUEL/AIR METERING OR EGR METERING TO AN INTERNAL COMBUSTION ENGINE

BACKGROUND AND OBJECTS

The inventor and his associates at A.E.A. have long been developing engine designs for ultra-lean combustion. Much of the work is described as "High Swirl Very Low Pollution Piston Engine Employing Optimizable Vorticity" U.S. Pat. No. 4,344,394. The technology described in this patent permits engines to be operated at exceptionally lean air/fuel ratios with efficiency at or approaching that of small automotive diesels and with exceptionally low $NO_x$ emissions. In an engine such as that described in U.S. Pat. No. 4,344,394 the cylinder-to-cylinder, cycle-to-cycle, and microscale volume mixing statistics on air/fuel ratio are much tighter than in the prior art, and the statistical variation of mixture motion inside the cylinder is also tightened. With such an engine, it has been found that the optimal fuel economy air/fuel ratio, using the Schweitzer Procedure for determining the true best economy mixture, occurs at very lean ratios. When the engine is operated richer than this optimal point, the cyclic variation of flame speed and cyclic variation of peak pressure observed in the engine is very much less than that characteristic of prior art engines. It has been found imperically that the point of optimal fuel economy (which is nearly the point for minimum $NO_x$ emissions) correlates over the speed load phase space with the onset of significant statistical variation of flame speed and peak pressure. The statistical variations of flame speed and peak pressure are not greater than the variations commonly encountered with ordinary mixtures at stoichiometric or slightly lean ratios, but the statistical variations can be measured and used as engine control inputs. It is highly desirable that the engine operate (except at very high loads where rich mixtures are required to make torque) at air/fuel ratios which are lean enough for a specific range of statistical variation of flame speed (not misfire). If the air/fuel ratio is controlled to achieve this borderline roughness, fuel economy is nearly optimized and $NO_x$ is nearly minimized. The adjustment of air/fuel ratio for borderline roughness gives the proper engine adjustment for efficiency and $NO_x$ control regardless of fuel type (e.g. gasoline vs. methanol) or intake air density, and efficiently compensates for variations in flame stability with internal or external EGR as a function of speed and load. The roughness control can also compensate for engine and ambient temperature.

It is therefore a purpose of the present invention to produce a control which reads a measure of flame speed or peak pressure, and adjusts air/fuel ratio so that the statistical variation of flame speed (or a reliably correlated measure of flame speed) achieves a specified degree of statistical variation. If the statistical variation is smaller than a set value, the control shifts the air/fuel ratio towards the lean side where statistical variation of flame speed is increased. If statistical variation of flame speed, or a measure of it, is excessive the mixture is shifted richer.

It is impossible to get the dynamic response of a roughness combustion control to be rapid enough to respond to the rapid load changes required for driveability if the roughness sensor acts alone. However, the roughness sensitive control can input a relatively slowly moving correction function for a faster automatic control system. Specifically, the control can continuously update a variable which multiplies the air/fuel ratio selected by a more rapid autonomous fuel/air metering controller. The autonomous fuel/air metering system can be built to respond to variations in speed, load, etc., and can have very rapid response. Therefore the control system of the current invention uses the roughness control as a correction function which adjusts the calibration of an automatic programmed air/fuel metering system continuously.

The advantages of $NO_x$ control and improved efficiency available with enleanment occur because the leaner mixtures have lower peak flame temperatures and hence lower dissociation losses and lower NO formation kinetic rates. These same effects can be obtained with introduction of EGR for a richer air/fuel ratio rather than with enleanment of the air/fuel ratio itself. It is, therefore, another purpose of the present invention to produce a control which reads the measure of flame speed or peak pressure and adjusts EGR input so that the statistical variation of flame speed achieves a specified degree of statistical variation. Such an EGR control can achieve the same advantages as enleanment with a super-homogeneous engine operated with in-cylinder flow control. The EGR control can also be useful as a drivability control for more conventional engines, and can, therefore, be applied to EGR controls on current vehicles as well as to EGR introduction to better-mixed systems.

A number of measures of flame speed, and hence cyclic variation of flame speed, are available. One can read the peak acoustic pressure at each exhaust blowdown since this peak pressure correlates inversely with flame speed. Another convenient measure of flame speed is the ionization resistance at the spark gap on refiring the plug 20 or 30 degrees after the initial ignition. Whichever combustion measure is chosen, the control system functions by taking a running total of a flame speed measure and controlling air/fuel ratio to adjust the flame speed measure variance to a set value.

Applied to an engine such as the ultra-homogenous variable restriction flap engine of U.S. Pat. No. 4,344,394 a roughness sensor control superimposed on a rapid response fuel/air metering system or EGR introduction system serves to optimize $NO_x$ and other emissions, maximize fuel efficiency, and compensate for variations in fuel, altitude, temperature and other variables.

IN THE DRAWINGS

FIG. 1 illustrates the variation of efficiency versus fuel/air ratio for the constant volume fuel/air cycle. (Source: FIGS. 0-2, *The Internal Combustion Engine in Theory and Practice*, Volume 2, C. F. Taylor, MIT Press, 1968.)

FIGS. 2a and 2b illustrate the variation in peak pressure and flame speed which is characteristic of spark-fired engines under different conditions.

DETAILED DISCUSSION

Figure 1:
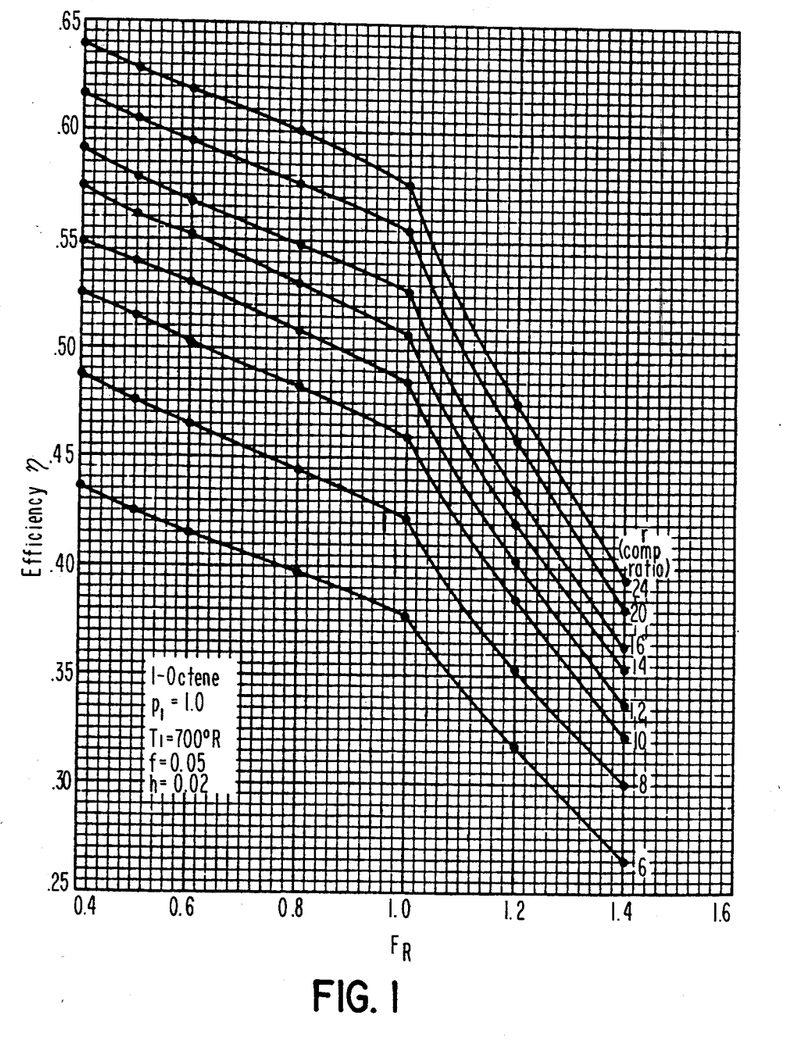

FIG. 1 illustrates the variation of efficiency versus equivalence ratio (fuel/air ratio at stoichemetric ÷ fuel/air ratio actual) for the constant volume fuel/air cycle. (Source: FIGS. 0-2 *The Internal Combustion Engine in Theory and Practice*, Volume II, C. F. Taylor, MIT Press, 1968.)

FIG. 1 illustrates the thermodynamic advantages of lean combustion so long as the constant volume cycle can be approximated. The constant volume cycle assume instantaneous combustion at top dead center, but can be adequately approximated even for combustion durations of 40 or 50 crank degrees so long as the combustion process is timed so that the bulk of the combustion happens near top dead center. The indicated efficiency of an engine with excellent mixing and complete combustion can be reasonably close to that of the fuel/air cycle so long as flame speeds are adequate and variations of flame speed from cycle to cycle are relatively small.

Figure 2A:
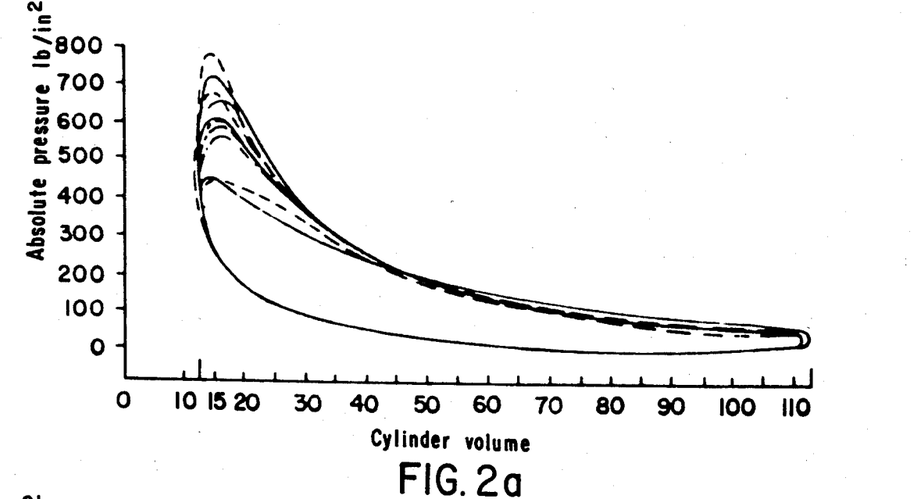
FIG. 2a illustrates combustion in an engine with typical mixing and lean combustion.
Figure 2B:
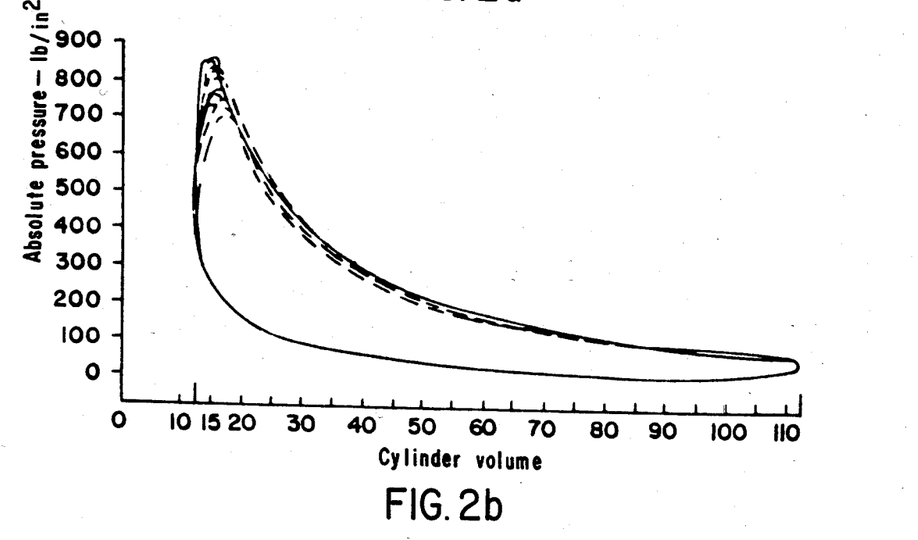
FIG. 2b shows operation of the engine under similar conditions but with rich combustion. (Source: *The Internal Combustion Engine in Theory and Practice*, Volume 2, op cit, FIGS. 1-18 taken in turn from Soltan, "Cylinder Pressure Variations in Petrol Engines," Institution of Mechanical Engineers [London Proceedings of the Automobile Division, 1960-1961, #2, Page 99].)
Figure 2C:
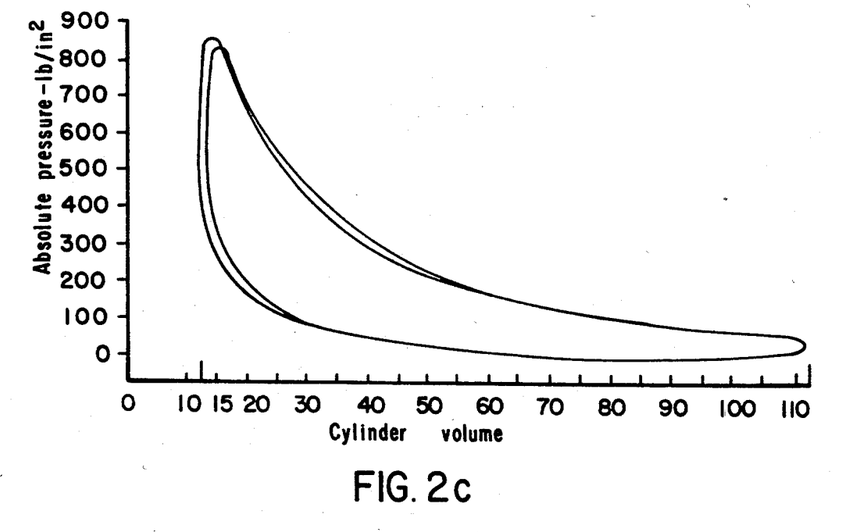
FIG. 2c sketches the very small variation in flame speed typical of the fluidic port ultra-homogeneous engine under conditions richer than optimal conditions.

FIGS. 2a and 2b illustrate the variation in peak pressure and flame speed which is characteristic of typical current art spark-fired engines under different mixture conditions. FIG. 2a illustrates combustion in an engine with typical mixing at 2000 rpm with a compression ratio of 9 at an equivalence ratio of 0.82, which is considered a relatively lean ratio for typical engine combustion. It can be seen that there are rather substantial variations in peak pressure characteristic of these lean mixtures. These peak combustion variations produce significant efficiency decrements and perceptible engine vibration. (Source for both FIGS. 2a and 2b: *The Internal Combustion Engine in Theory and Practice*, Volume 2, op cit, FIGS. 1-18 taken in turn from Soltan, "Cylinder Pressure Variations in Petrol Engines," Institution of Mechanical Engineers [London Proceedings of the Automobile Division, 1960-1961, #2, Page 99].) FIG. 2b shows operation of the same engine at the same rpm but with a rich equivalence ratio of 1.25 showing the cyclic variation which is characteristic of typical art engines when operated rich. The degree of cyclic variation of flame speed characteristic of the ultra-homogeneous engine when operated under optimal conditions is approximately equal to the statistical variation in peak pressure shown in FIG. 2b. FIG. 2c sketches the very small variation in flame speed typical of the fluidic port ultra-homogeneous engine under conditions richer than optimal conditons. Under these relatively rich conditions (which may be as lean as an equivalence ratio of 0.6) cyclic variation of peak pressure is barely perceptible. Invariably it is found that the optimal efficiency point occurs at a point where statistical variation of peak pressure and flame speed has become significant. This is the point where the losses due to heat release away from top dead center due to statistical variation about the mean optimal spark timing balance the additional thermodynamic advantages of enleanment which were illustrated with respect to FIG. 1.

Figure 3:
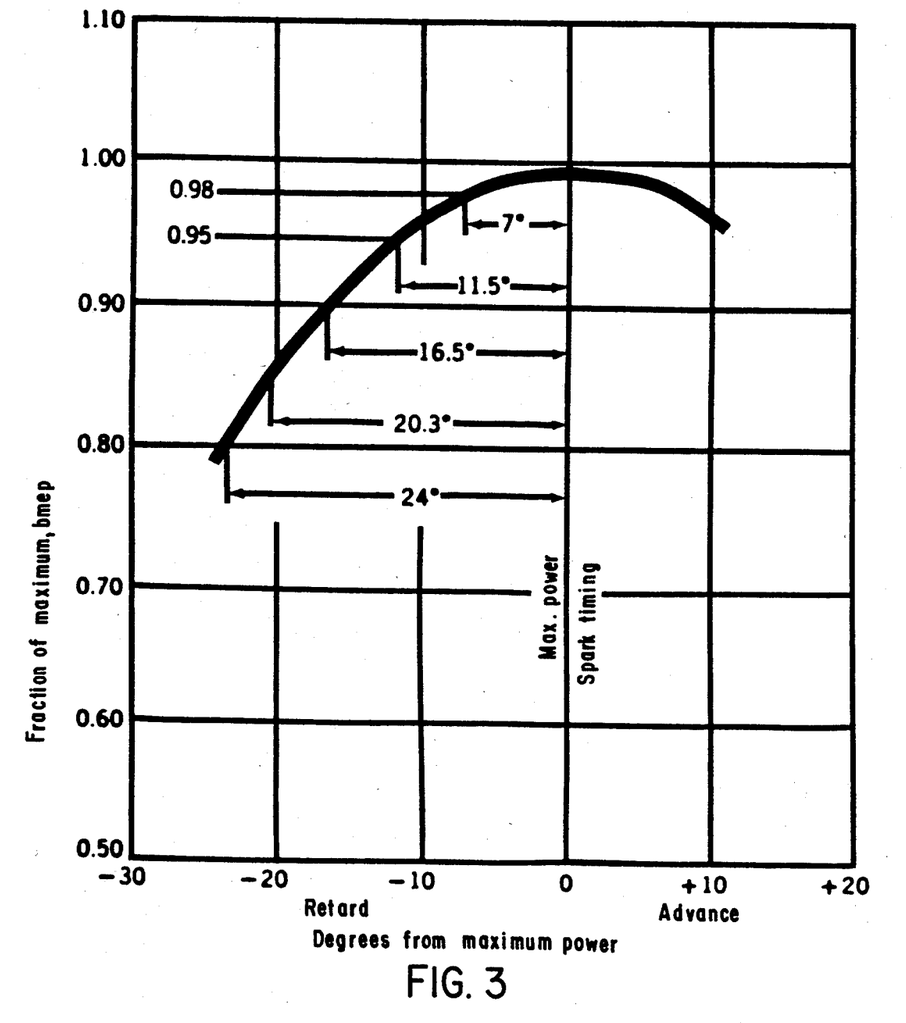
FIG. 3 illustrates by analogy the reason statistical variation of flame speed penalizes efficiency. (Source: *The Internal Combustion Engine in Theory and Practice*, Volume 1, op cit, FIGS. 12-14.)

FIG. 3 illustrates by analogy the reasons statistical variation of flame speed penalizes efficiency. The figure plots the correlation of brake mean effective pressure (a normalized torque measure) versus spark-advance deviation from the best torque spark advance. (Source: *The Internal Combustion Engine in Theory and Practice*, Volume I, op cit, FIGS. 12-14.) Investigation of the curve of FIG. 3 shows that the decline in efficiency is approximately proportional to the 1.8 power of spark timing deviation from its optimal value. It happens that the great bulk of the statistical variation in flame speed occurs in the first two percent of combustion pressure rise, so that statistical variation of flame speed is, in effect, a random variation in spark timing from cycle to cycle on a hypothetical engine where flame speed is otherwise constant. The efficiency penalty for flame speed variance is therefore roughly proportional to the 1.8 power of the variance. A small degree of flame speed and peak pressure variation consequently does relatively little harm but the efficiency penalty with flame speed variance increases almost as the square of the variance. With this in mind, it should be easy to understand why the optimal efficiency point for a very homogeneous and fluid-mechanically reproducible engine will occur at a very lean point where the trade-off between statistical variation of flame speed and the inherent thermodynamic advantage of further enleanment balances.

Figure 4:
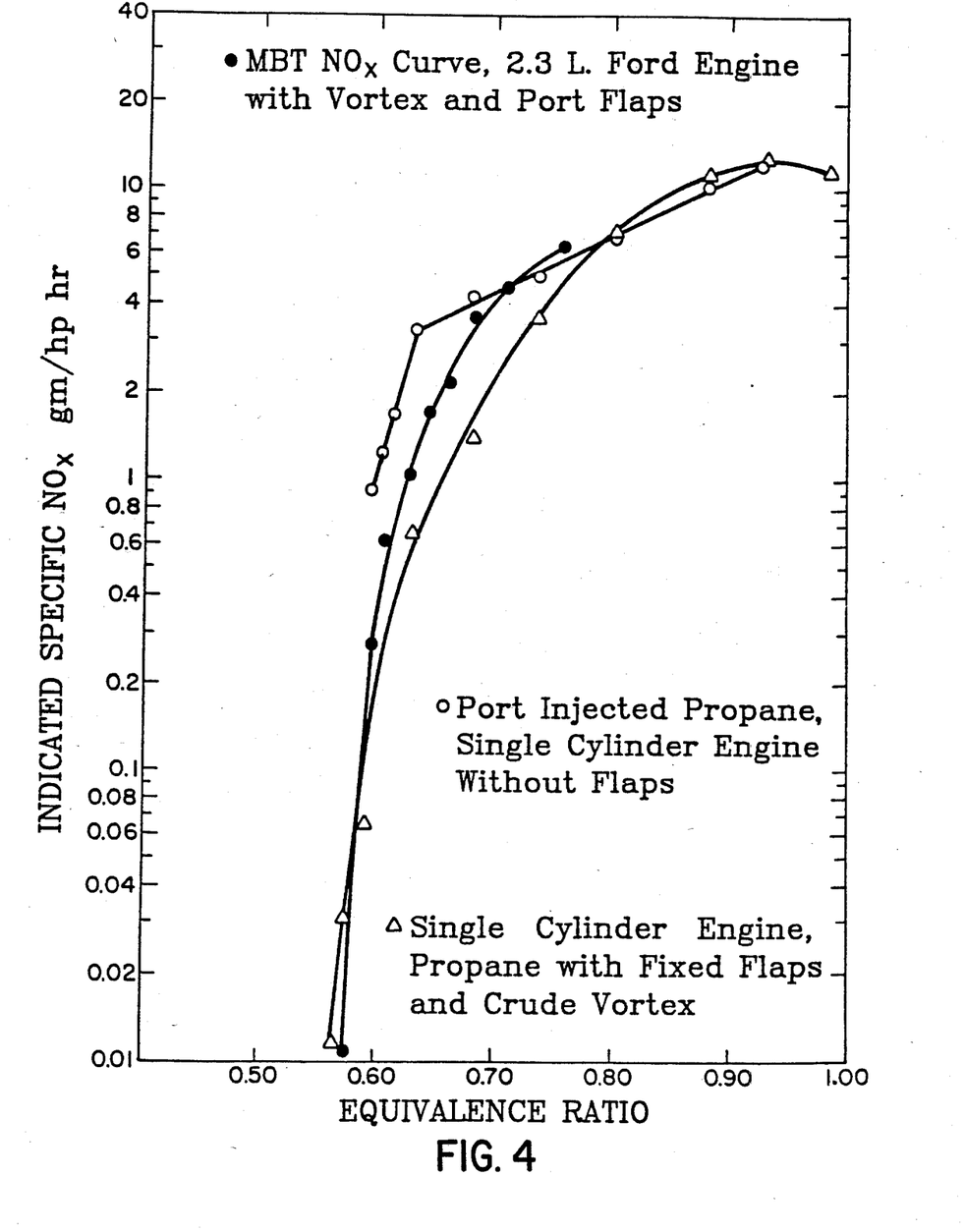
FIG. 4 shows the dependence of $NO_x$ emissions in grams per indicated horsepower hour on equivalence ratio (fuel/air ratio) for the variable restriction port ultra-homogeneous engine.

FIG. 4 shows the dependence of $NO_x$ emissions in grams per indicated horsepower hour on equivalence ratio for a variable restriction port ultrahomogeneous engine described in U.S. Pat. No. 4,344,394. Much of the data from FIG. 4 is also shown in FIG. 60 of U.S. Pat. No. 4,344,394, but the figure also includes data from a 2.3 liter Ford engine operated with a vortex and fluidic ports on gasoline. The performance of both the single cylinder engine and the Ford engine was such that the optimal efficiency occurred at equivalence ratios in the range of 0.6 stoichemtric and leaner. This result was typical over a wide range of speeds and loads. At the optimum fuel economy ratios, $NO_x$ is quite low. By controlling the equivalence ratio to achieve a specified level of cyclic variation it is possible to approximate closely the optimal fuel economy and minimum $NO_x$ for the entire engine phase space of speeds and loads.

Figure 5:
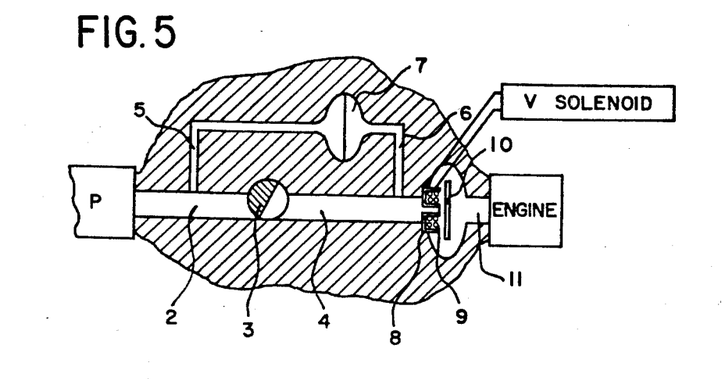
FIGS. 5, 6 and 7 show schematically a fuel/air metering system intended to supply an ultra-lean engine, and shows the manner in which the roughness control enters into the overall fuel/air control scheme.
Figure 6:
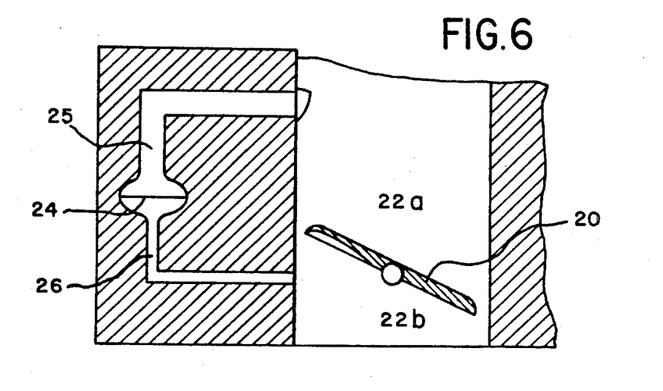
Figure 7:
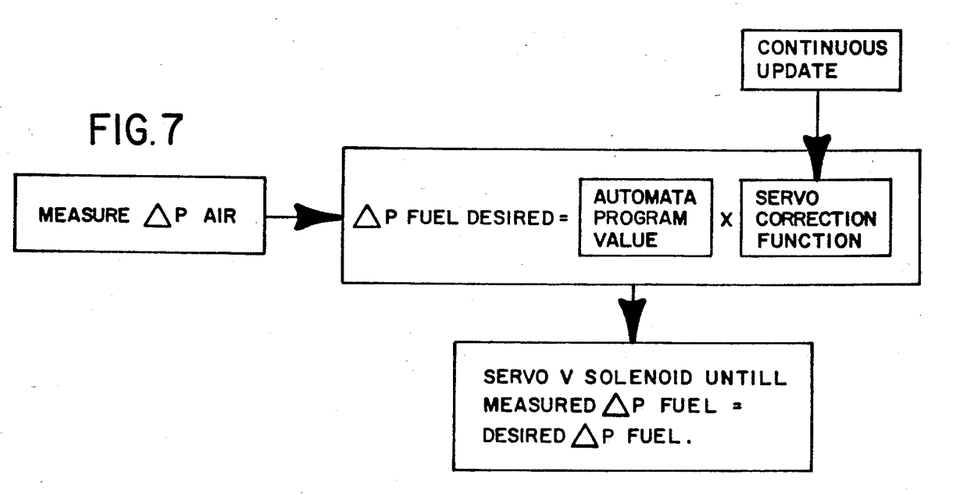

FIGS. 5, 6, and 7 show schematically a fuel/air metering system intended to meter fuel and air to an ultralean engine such as that described in U.S. Pat. No. 4,344,394 and shows the manner in which the roughness control enters in to the overall fuel/air control scheme. FIG. 5 shows schematically fuel flow across the slotted valve 3 controlled by a solenoid servo valve 8, 9 which supplies the engine. The pressure differential across the slotted valve is called $\Delta P$ fuel. FIG. 6 shows an air throttle linked mechanically and with coefficients of discharge matched to the slotted fuel valve of FIG. 5 and shows an air pressure transducer to pressure $\Delta P$ air across the air throttle. FIG. 7 shows the fuel/air across the air throttle. FIG. 7 shows the fuel/air system schematically. A measured $\Delta P$ air inputs into a computer which computes a $\Delta P$ fuel desired as the product of an automatically programmed function (in terms of $\Delta P_{air}$, rpm, etc.) times a servo correction coefficient which is adjusted to bias the control system to the proper degree of cyclic variation in flame speed. Once the computer specifies the $\Delta P$ fuel desired, an analog servo controls the voltage on the servo solenoid valve of FIG. 4 until $\Delta P$ fuel measured = $\Delta P$ fuel desired. This equilibrium process occurs in about ten milliseconds. The cyclic time of the computation process shown in FIG. 7 can vary, but it can be made very fast. The fuel/air metering system of FIGS. 5, 6 and 7 is automatic and has very rapid response, but has its fuel-/air metering calibration adjusted continuously by the roughness sensor servo control. This roughness sensor servo control can update the servo correction coefficient once every exhaust blowdown or once every combustion event.

Figure 8:
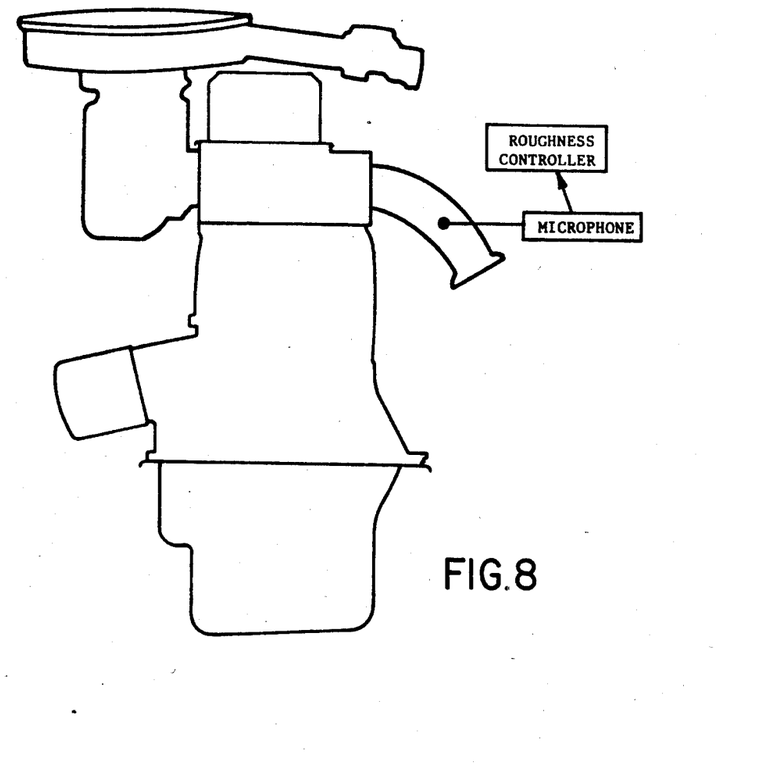
FIG. 8 is an illustration of an internal combustion engine, shown schematically with a microphone pickup which inputs an exhaust pressure signal to the controller.

FIG. 8 is an illustration of an internal combustion engine, shown schematically with a microphone pickup which inputs an exhaust pressure signal to the controller. Peak exhaust blowdown pressure is a useful measure of flame speed and variation in peak blowdown pressures measures flame speed variation. It is not necessary that the exhaust pressure microphone be located in the position shown in FIG. 8, and indeed it may be desirable to place the microphone in a much cooler passage (for example, in the exhaust passage downstream of a mixing vortex, in a position where the exhaust gas has been much cooled).

Figure 9A:
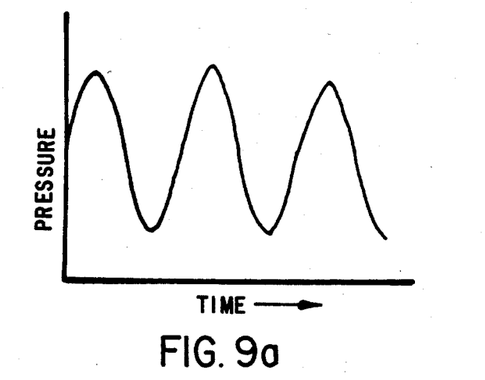
FIG. 9a shows pressure in an exhaust manifold under conditions where the engine is operating smoothly and the variation in peak blowdown pressure is small (flame speed variation is small).
Figure 9B:
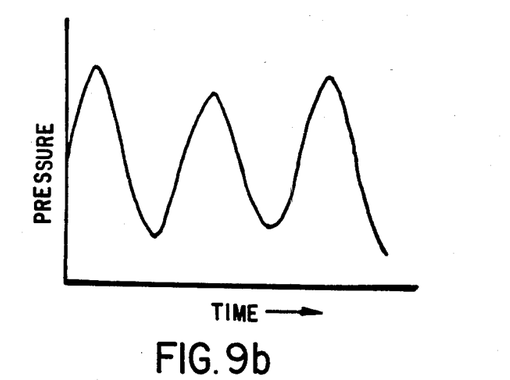
FIG. 9b shows the pressure curve which occurs when blowdown pressure varies (flame speed varies).

FIG. 9a shows pressure in an exhaust manifold under conditions where the engine is operating smoothly and the variation in peak blowdown pressure is small (flame speed variation is small). An engine with the ultrahomogeneous characteristics of the engine of U.S. Pat. No. 4,344,394 would be operating too rich if it had an exhaust pressure pulse wave form such as this (unless the engine was operated at such a high torque demand that enrichment of the mixture was inescapable because of engine airflow limits). FIG. 9b shows the pressure curve which occurs when blowdown pressure varies (flame speed varies).

Figure 10:
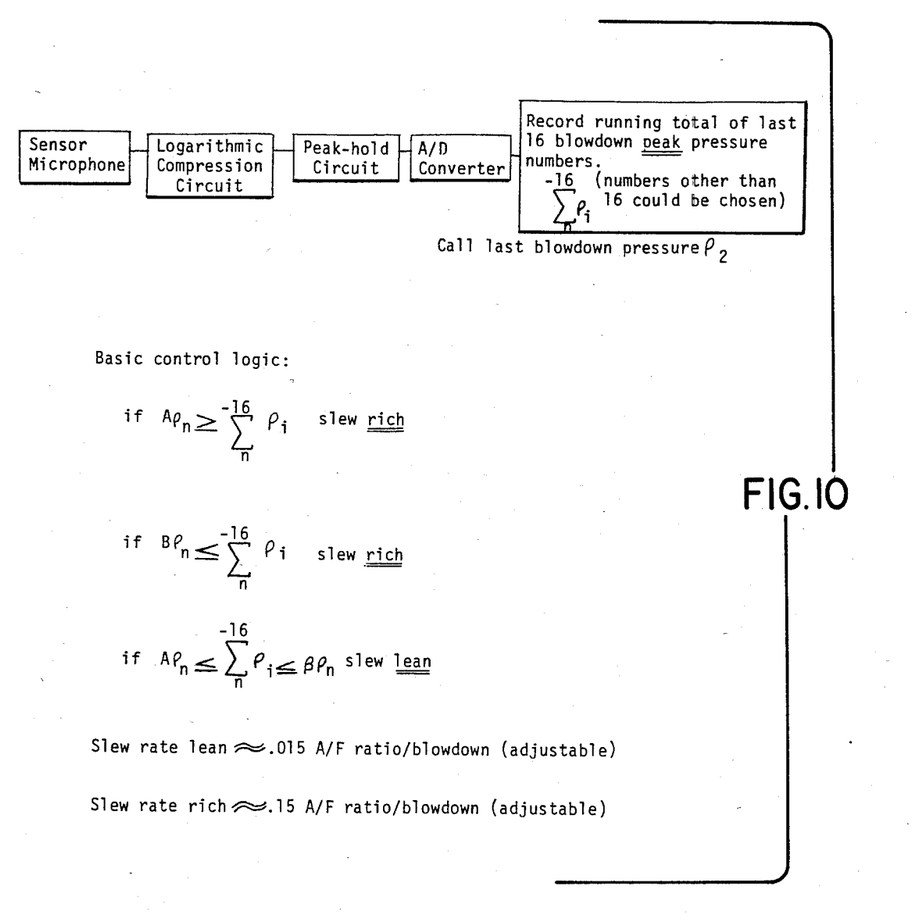
FIG. 10 is a schematic showing the algorithm whereby the signal from the sensor exhaust microphone is used for combustion control.

FIG. 10 is a schematic showing the algorithm whereby the signal from the exhaust microphone is used for combustion control. The drawing is largely self-explanatory. The exhaust pressure signal from the sensor microphone is compressed by a logarithmic compression circuit for electronic convenience and an electrical circuit is arranged to hold the peak voltages which correspond to the exhaust blowdown pressure. These peak voltages are read with an analog to digital converter and thereby converted to numbers. The computer keeps a running total of the last 16 blowdown peak pressure numbers in the normal way, where the last blowdown number enters the summation and the 17th is dropped out on a continous update basis. After each blowdown the computer compares the last blowdown number with the running total blowdown average, and makes the following decisions. If the last blowdown number varies by more than a specified value from the average of the previous 16 values, the roughness control adjusts the roughness coefficient in FIG. 7 to enrich the mixture. If the blowdown pressure number falls within the specified limits, the circuit adjusts the control coefficient in FIG. 7 to enlean the mixture. The slew rate lean should typically be much slower than the slew rate rich (perhaps a tenth as fast) since the penalty for excessive enleanment may be misfire, whereas the penalty for excessive richness is only an $NO_x$ emission penalty in an engine characterized by low $NO_x$ emissions. It should be clear to those skilled in the servo mechanical arts that the slew rates lean and rich and the numerical values of A and B are variables which may be adjusted by the designer as he optimizes the system.

The system is also subject to a number of overrides, as follows: (1) Cranking override—if blowdown frequency is less than 6 cycles per second and greater than 0 cycles per seconds, slew rich for starting. (2) Deceleration fuel shut-off override—if rpm is greater than 600 and there is neglible blowdown pressure (engine not firing) no slew rate either rich or lean and no slew for the first 10 to 20 blowdowns after firing resumes. (3) Cold enrichment override—once slew rate rich to increase with decreasing sensor temperature below approximately 10° C. (slew may double every 10° C. thereafter).

Those skilled in the servo-mechanical arts will recognize that a number of the variables set out above can be changed if this is convenient. A and B, the upper and lower percentage variation threshholds for enrichening, are variable. The number of entries in the running total can be varied. The slew rates lean and rich can be varied and the variation of slew rate with temperature is also variable.

The roughness combustion control system can be very similar if its input is another measure of flame speed. An extremely convenient measure of flame speed is the ionization resistance of the combustion gases measured a specified time or specified number of crank degrees after ignition. This may be measured by firing the spark plug a second time a set number of crank degrees (say 30 crank degrees) after the ignition firing. The spark plug gap will at this time be inside a cloud of post-flame combustion gases, and the ionization breakdown voltage will be less than a hundredth that required for ignition itself. This ionization breakdown voltage is a strong function of temperature and pressure. Therefore variation of this breakdown voltage can serve as the input for the combustion roughness control. To illustrate this, FIG. 11a is a schematic of an engine and ignition system with the ignition system adapted to fire the spark plug a second time 30 degrees after the ignition firing to provide an ionization probe signal to measure flame speed.

Figure 11A:
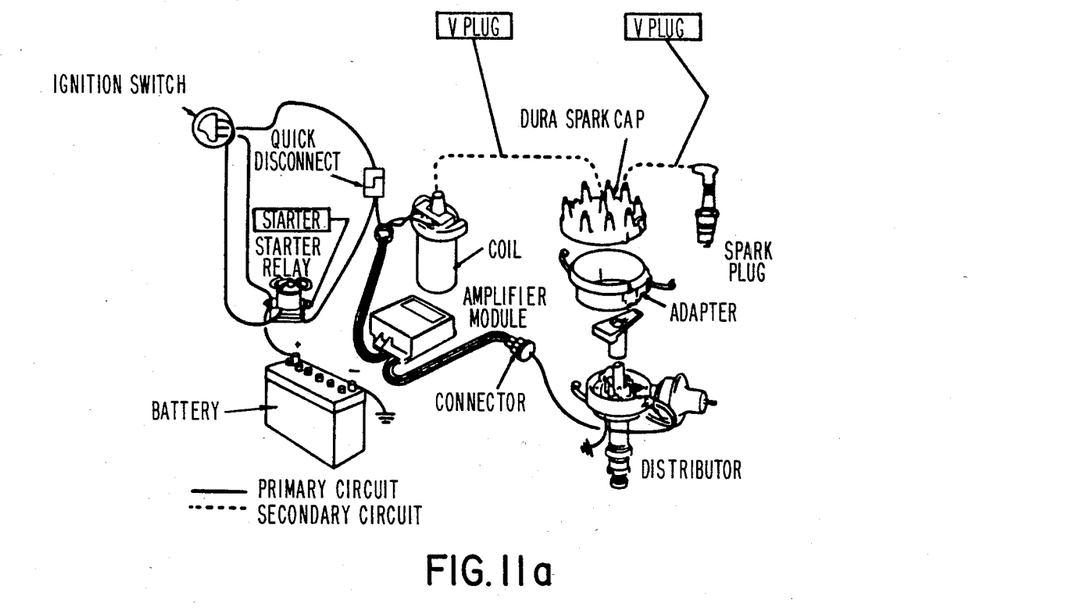
FIG. 11a is a schematic of an engine and ignition system with the ignition system adapted to fire the spark again 30° after the ignition firing to provide an ionization probe signal to measure flame speed. Breakdown voltage at the second firing correlates reliably with flame speed.
Figure 11B:
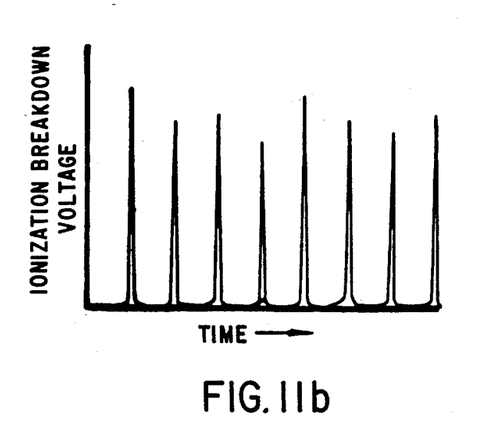
FIG. 11b is a sketch of the ignition wire voltage curve which is characteristic of low statistical variation of flame speed.
Figure 11C:
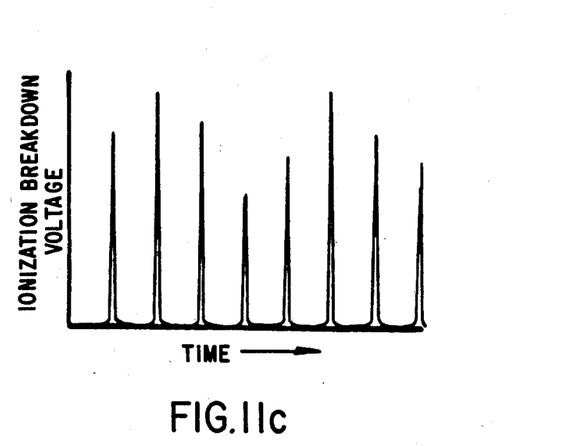
FIG. 11c is a sketch of the wire ignition voltage which is characteristic of relatively rough combustion.

FIGS. 11b and 11c sketch the wire voltage traces from a system such as that of FIG. 11a. Only the ionization breakdown voltages are shown. When the spark fires 30° after ignition, the breakdown voltage is very much less than that required of the ignition spark. This breakdown voltage is a function of the ionization temperature and pressure in the spark gap, and varies sensitively with flame speed. Because the bulk of the flame speed variation occurs in the first 10°-20° after the spark, the temperature and pressure in the spark gap at the time of ionization signal sparking 30° after ignition will vary sensitively with variations in flame speed and the breakdown voltage signal will therefore be a convenient measure of flame speed and variation. FIG. 11b is a sketch of the wire voltage curve which is characteristic of low statistical variation of flame speed. FIG. 11c is a sketch of the wire voltage curve trace which is characteristic of relatively rougher combustion. In both cases, the ionization measuring voltages can easily be distinguished from the much higher ignition spark voltages.

Referring again to FIG. 11a, the schematic shows two potential pick-ups for the plug (the plug is the signal fed into the controller). In the one case, the central distributor wire to the coil is used for the pick-up. In this case, an ionization voltage signal is obtained from each spark plug in each cylinder. Alternatively, the voltage pick-up can occur on only one spark plug, as is also illustrated in 11a. If the plug signal comes directly from the coil, an ionization breakdown signal will go the controller with every combustion event in the engine. However, it will be necessary for the controller to compensate for the variations in ionization breakdown voltage which are functions of plug gap geometry from plug to plug. If voltage breakdown is only taken from a single plug, this additional statistical complexity need not be handled, but the slew rate of the controller must be slower for stability, and the controller only reads variation from a small sequential sample of combustion events.

Figure 12:
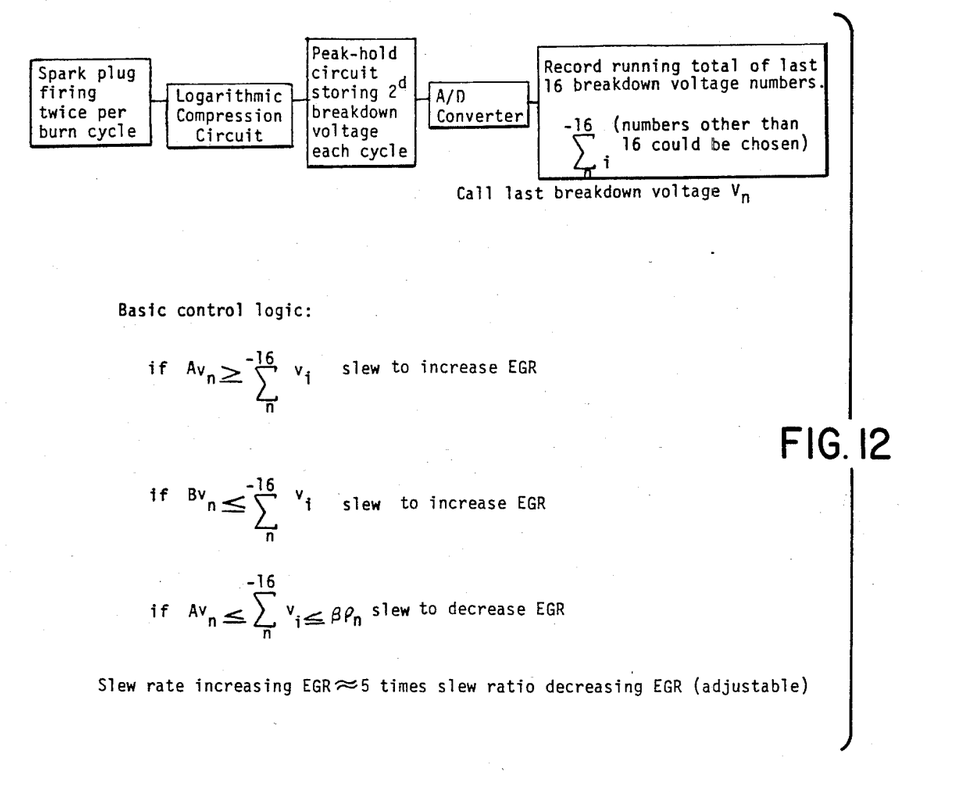
FIG. 12 is a schematic analogous to the schematic of FIG. 10 where the input is ionization breakdown voltage measured as shown above.

FIG. 12 is a schematic analogous to the schematic of FIG. 10 where the input is ionization breakdown voltage measured as shown above. The comments applicable to discussion of FIG. 10 are applicable to FIG. 12. The ignition breakdown method has some conveniences, and is particularly adaptable to the transistorized ignitions which are coming to dominate much of the automotive market. The spark plug itself is an available sensor, and breakdown voltage on each spark plug can be measured. However, breakdown voltage will be proportional to the square of the spark gap, and if the system is used to adapt to each of the cylinders, a slow moving running total coefficient for breakdown voltage on each of the spark gaps must be built into the computer so that breakdown variations accountable from spark gap variations from cylinder to cylinder are not counted as variance of flame speed within the algorithm. Those skilled in the computer arts should find it clear how to do this.

In an engine intended to run with complete homogeneity, tightly controlled fluid mechanics and ultra-lean combustion, the optimal fuel economy point at all speeds and loads is the air/fuel ratio for a small but perceptible degree of combustion variance. The combination of a combustion control which controls air/fuel ratio to this degree of variance with an autonomous rapid response fuel/air metering system, as illustrated in FIGS. 5, 6 and 7, produces optimization of economy and emission minimization in combination with a system having extremely rapid dynamic response.

Figure 13A:
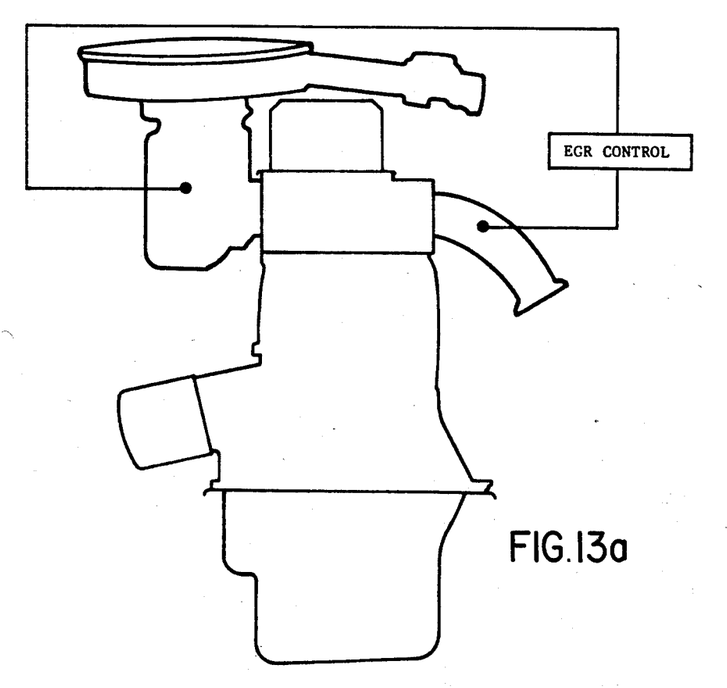
FIGS. 13a and 13b are schematics of an engine with an EGR control system where EGR supply is a function of an automatic programming with engine variables, with a continuously updated bias controlled by a roughness control.
Figure 13B:
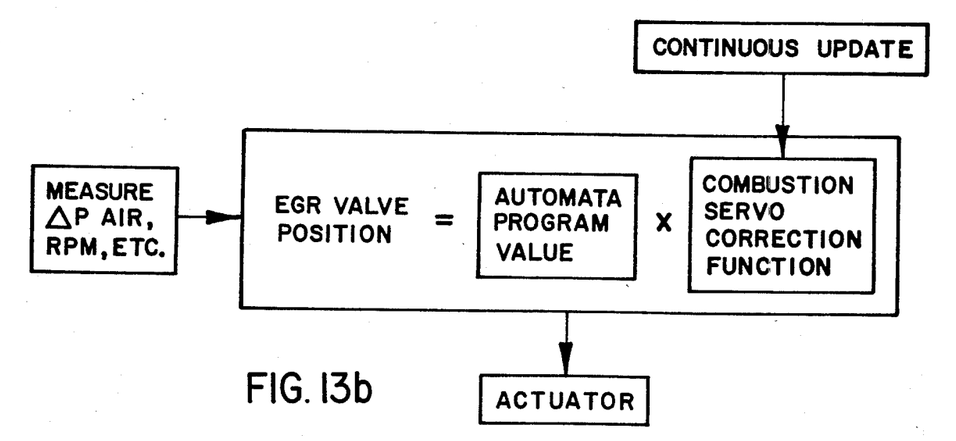
Figure 14:
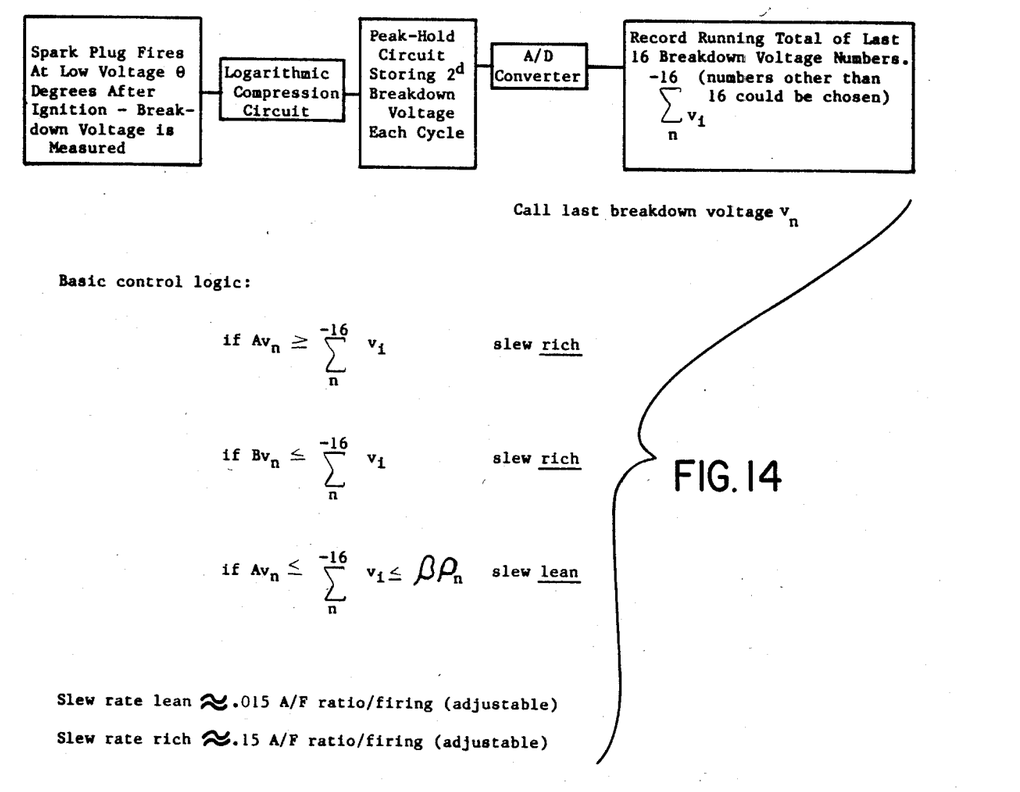
FIG. 14 is a schematic analogous to the schematic of FIG. 12 wherein the roughness controller adjusts the setting of an electronically controlled EGR system rather than adjusting air/fuel ratio.

The arguments above for controlling charge dilution in a homogeneous engine via enleanment are equally applicable under the same homogeneous conditions if the dilution of the mixture which suppresses peak flame temperature is achieved via EGR introduction, so long as the overall air/fuel ratio is lean enough to control carbon monoxide. There are currently on the market a number of EGR controls where the EGR supply to the engine is controlled in an automatic fashion as a function of air pressure drops, rpm, temperature and other inputs. The roughness control logic described above can be adapted straightforwardly to serve as a continuously updated biasing correction function for such EGR systems. FIG. 13a shows schematically an engine with an EGR control. FIG. 13b illustrates in block diagram form the application of the combustion roughness servo logic to such an EGR control system. The EGR valve position is controlled as a function of automatic inputs, including $P_{air}$, rpm, etc., and is varied by a slowly-moving correction function from the combustion servo, which is continuously updated as before. The combined effect of the automota fast response programming and the slowly-moving combustioned servo correction function produces the actuator position which controls EGR flow. FIG. 14 blocks out the control algorithm for such an EGR controller, utilizing spark plug firing as the input measure of combustion variability. Comments applicable to FIG. 12 and FIG. 10 are applicable here. A similar algorithm utilizing an exhaust pressure microphone as the combustion variability signal can be produced.

I claim:

1. Control apparatus for obtaining a measure of flame speed in the combustion chamber of an internal combustion engine and based on said measure adjusting air/fuel ratio apparatus so that the variation of flame speed falls within a specified degree of statistical variation, said apparatus comprising means for obtaining a measure of flame speed on each burn cycle of the engine and producing an electric signal having a peak representative thereof, means for storing in succession the signal peaks of said electric signals, means for converting the signal peaks to a plurality of numbers corresponding respectively to said signal peaks, computer means for averaging said numbers for a given quantity of successive cycles and comparing said average with the last received signal peak number and means for comparing the number average and that of the last received signal peak to produce a difference and acting on the air/fuel ratio apparatus to enlean the mixture if the difference is within designated limits and acting to enrich the mixture if the difference is outside the designated limits whereby the air/fuel mixture is adjusted so that the flame speeds of the burn cycles will fall within a specified degree of statistical variation.

2. The invention as set forth in claim 1 and wherein the measure of flame speed of each burn cycle comprises means for sensing peak exhaust blowdown pressure.

3. The invention as set forth in claim 1 and wherein each combustion chamber is provided with a spark plug for ignition purposes and the measure of flame speed of each burn cycle comprises means for measuring the ionization resistance of the combustion gases at a specified time after ignition by refiring the spark plug.

4. The invention as set forth in claim 1 and wherein the measure of flame speed is not obtained for each burn cycle, but only for a selected sequence of burn cycles.

* * * * *